(12) United States Patent
Suematsu et al.

(10) Patent No.: US 10,036,856 B2
(45) Date of Patent: Jul. 31, 2018

(54) CONNECTOR WITH BUILT-IN BENT OPTICAL FIBERS AND METHOD FOR PRODUCING BENT OPTICAL FIBERS

(71) Applicant: Furukawa Electric Co., Ltd., Tokyo (JP)

(72) Inventors: Katsuki Suematsu, Tokyo (JP); Takeshi Akutsu, Tokyo (JP); Kohei Kawasaki, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 15/403,622

(22) Filed: Jan. 11, 2017

(65) Prior Publication Data

US 2017/0123164 A1    May 4, 2017

Related U.S. Application Data

(63) Continuation of application No. PCT/JP2015/070074, filed on Jul. 13, 2015.

(30) Foreign Application Priority Data

Jul. 11, 2014    (JP) .................. 2014-143316

(51) Int. Cl.
*G02B 6/26* (2006.01)
*G02B 6/38* (2006.01)
(Continued)

(52) U.S. Cl.
CPC ............ *G02B 6/3829* (2013.01); *C03B 37/15* (2013.01); *G02B 6/3881* (2013.01); *G02B 6/428* (2013.01); *G02B 6/4249* (2013.01)

(58) Field of Classification Search
CPC ...... G02B 6/3829; G02B 6/3881; C03B 37/15
See application file for complete search history.

(56) References Cited

U.S. PATENT DOCUMENTS

| 4,812,001 A | 3/1989 | Tomita et al. |
| 2007/0138730 A1 | 6/2007 | Tsutsui et al. |

(Continued)

FOREIGN PATENT DOCUMENTS

| JP | S55-138706 A | 10/1980 |
| JP | S64-49002 A | 2/1989 |

(Continued)

OTHER PUBLICATIONS

Decision to Grant dated Mar. 27, 2017 in counterpart JP Appiicatian No. 2016632994 (with English Trangiation).

(Continued)

*Primary Examiner* — Sung Pak
(74) *Attorney, Agent, or Firm* — Dorsey & Whitney LLP

(57) ABSTRACT

A connector with built-in bent optical fibers includes an optical fiber array including a plurality of bent optical fibers each having a bent portion and a linear portion formed integrally with the bent portion, a ferrule having a plurality of positioning mechanisms that align end portions of the plurality of bent optical fibers, and a resin portion disposed at an outer periphery of the bent portion. The resin portion is filled in the ferrule. The bent portion has a bending angle of 85°-150°. When the bent portion of one bent optical fiber is divided into a plurality of regions along a longitudinal direction at 10°, a variation in bend radius among the plurality of regions excluding regions corresponding to 10° at both ends is 0.3 mm or less, an outer diameter of the bent portion of the bent optical fiber is smaller than an outer diameter of the linear portion.

15 Claims, 13 Drawing Sheets

(51) Int. Cl.
   *G02B 6/42*    (2006.01)
   *C03B 37/15*   (2006.01)

(56) References Cited

U.S. PATENT DOCUMENTS

| | | |
|---|---|---|
| 2007/0183730 A1 | 8/2007 | Morimoto et al. |
| 2008/0240657 A1 | 10/2008 | Dean et al. |
| 2012/0167821 A1 | 7/2012 | Sudo et al. |
| 2014/0010499 A1 | 1/2014 | Suematsu et al. |

FOREIGN PATENT DOCUMENTS

| | | | |
|---|---|---|---|
| JP | H7-113918 A | | 5/1995 |
| JP | 2003-035843 A | | 2/2003 |
| JP | 2004-205970 A | | 7/2004 |
| JP | 2005-292718 A | | 10/2005 |
| JP | 2008-152229 A | | 7/2008 |
| JP | 2008152229 A | * | 7/2008 |
| JP | 2009-023855 A | | 2/2009 |
| JP | 2009-023885 A | | 5/2009 |
| JP | 2011-085718 A | | 4/2011 |
| JP | 2012-140299 A | | 7/2012 |
| JP | 2015-218090 A | | 12/2015 |
| WO | 2015076105 A1 | | 5/2015 |

OTHER PUBLICATIONS

International Search Report and Written Opinion received in PCT/JP2015/070074 dated Aug. 11, 2015 (Engl. Translation of ISR only).

Morimoto, et al., "R=1.mm 90°-Bent Multi-Mode OpticalFiber 2—The study of the bending loss by using BPM simulaton", IEICE Technical Report Aug. 21, 2008, Vo. 108, No. 193 (Engl. Abstract Only).

Notification to Grant Utility Model Patent Right dated Jun. 22, 2017 in a corresponding Chinese Application No. 201590000786.5 (Including English Translation).

Extended European Search Report dated Jan. 24, 2018 for European Application No. 15818610.6.

* cited by examiner

CONNECTOR WITH BUILT-IN BENT OPTICAL FIBERS AND METHOD FOR PRODUCING BENT OPTICAL FIBERS

CROSS REFERENCE TO RELATED APPLICATIONS

This is a continuation application of International Patent Application No. PCT/JP2015/070074 filed Jul. 13, 2015, which claims the benefit of Japanese Patent Application No. 2014-143316, filed Jul. 11, 2014, the full contents of all of which are hereby incorporated by reference in their entirety.

BACKGROUND

Technical Field

The present disclosure relates to a method for producing bent optical fibers and a connector having the bent optical fibers built-in, and more particularly relates to a method for producing bent optical fibers including removing surface defects resulting from a bending process, and an optical connector with built-in bent optical fibers produced by the producing method.

Background

In recent years, with an increase in the speed of electronic circuits, there is an ongoing development in optical interconnects for performing communications in which light is used for data transmission between devices, circuit boards, or semiconductor chips, since there is a limit on an increase in speed with conventionally used copper wiring and the like.

An optical interconnect may be, for example, a system in which a vertical-cavity surface-emitting laser (VCSEL) is mounted on a circuit board, and transmission of an optical signal is performed by letting an optical signal emitted from the VCSEL enter and propagate through an optical fiber and receiving the optical signal by a photodiode mounted on a circuit board. Since a VCSEL is generally mounted parallel to a circuit board for space-saving and a low-profile circuit board, the emission direction of laser light emitted from the VCSEL is perpendicular to the circuit board. Furthermore, to perform transmission of an optical signal through an optical interconnect, light needs to be propagated parallel to the circuit board. Therefore, there has been proposed a bent optical fiber for vertically bending an optical signal emitted from a VCSEL, and a method for producing the same.

FIG. 12 is a perspective view illustrating a conventional method for producing a bent optical fiber. In this producing method, first, a portion of an optical fiber 110 from which a covering 102 has been removed is placed on a cylindrically shaped cartridge heater 104, and one end of the optical fiber 110 is fixed, and the other end has a weight 109 attached thereto. Accordingly, the portion of the optical fiber 110 in contact with the cartridge heater 104 is bent through an angle of about 90° by the gravity on the weight 109. Thereafter, the optical fiber 110 is annealed at a high temperature to remove a strain generated in the bent portion (Japanese Laid-Open Patent Publication No. S64-49002).

Furthermore, as another conventional method for producing a bent optical fiber, there has been proposed a method of, as shown in FIG. 13, placing a portion 204 of an optical fiber 201 between electrodes 203, and while being brought to a high temperature (equal to or higher than an inflection point, equal to or lower than a softening point) by an arc discharge 202 or the like, bending the optical fiber 201 with a predetermined radius. The bent portion of this optical fiber 201 is bent while it is in a high-temperature state, and after having been bent, it is brought to room temperature. Therefore, a strain caused by the bending is removed from the bent portion (Japanese Laid-Open Patent Publication No. 2005-292718).

On the other hand, as a conventional method for producing an optical fiber, there is a technology in which a ribbon-type optical fiber drawn from a base material is allowed to pass between a pair of guide rollers arranged opposite to each other, and reheating the ribbon-type optical fiber by allowing the ribbon-type optical fiber that has passed through the pair of guide rollers to pass through a continuous reheat furnace. In this technology, a scratch produced on the ribbon-type optical fiber by coming into contact with the pair of guide rollers is melted and removed by applying heat. Thereby a high-strength optical fiber can be obtained (Japanese Laid-Open Patent Publication No. H7-113918).

However, in the above-described technology of Japanese Laid-Open Patent Publication No. S64-49002, a plurality of minute scratches (surface defects) are formed on the surface of the optical fiber that has been bent by being pressed against the cartridge heater. Thus the strength of the optical fiber is significantly reduced, and becomes a cause of breaking of the optical fiber.

Furthermore, in the case of bending an optical fiber using a non-contact heat source, such as arc discharge like the above-described technology of Japanese Laid-Open Patent Publication No. 2005-292718, it is difficult to obtain a desired shape, i.e., a highly accurate bent shape with a desired angle, and the bending angle may widely vary.

Moreover, if the reheating method of Japanese Laid-Open Patent Publications No. H7-113918 is applied to remove scratches made on the bent portion in Patent Document 1, the entire bent optical fiber needs to be passed through the continuous reheat furnace, and there may be a case where optical propagation characteristics of the bent optical fiber after the removal of scratches cannot be maintained.

The present disclosure is related to providing a method for producing a bent optical fiber, which is capable of obtaining a highly accurate bent shape and enhancing the strength and further has good optical propagation characteristics after the removal of a defect, and a connector having said bent optical fibers built-in.

SUMMARY

According to a first aspect of the present disclosure, the connector with built-in optical fibers includes an optical fiber array that includes a plurality of bent optical fibers each bent optical fiber of the plurality of bent optical fibers including a bent portion and a linear portion formed integrally with the bent portion; a ferrule including a plurality of positioning mechanisms configured to align end portions of the plurality of bent optical fibers; and a resin portion that is placed on the outer periphery of the bent portion, the resin portion being filled in the ferrule, wherein the bent portion has a bending angle of greater than or equal to 85° and less than or equal to 150°, and, when the bent portion of one bent optical fiber is divided into a plurality of regions along a longitudinal direction at 10°, a variation in the bend radius among of the plurality of regions, regions excluding regions corresponding to 10° at both ends is less than or equal to 0.3 mm, and an outer diameter of the bent portion of the bent optical fiber is smaller than an outer diameter of the linear portion.

Furthermore, the number of the bent optical fibers is four or more, and a difference between the maximum angle and the minimum angle in a plurality of bent portions of all the bent optical fibers is within 2.0°.

Moreover, the bending angle of the bent portion can be greater than or equal to 90° and less than or equal to 105°.

The bend radius of the bent portion is preferably less than or equal to 5 mm, and more preferably less than or equal to 3 mm.

Furthermore, the inner surface of the bent portion is a satin finished surface. Moreover, the cross-sectional shape of the bent portion is a substantially elliptical shape having a minor axis that is along a direction connecting an inner surface and an outer surface of the bent portion.

Furthermore, an outer diameter of the linear portion of the bent optical fiber is between 80 μm to 126 μm.

Moreover, an outer diameter of the linear portion of the bent optical fiber is preferably between 124 μm to 126 μm, and the bent portion per bent optical fiber has a strength of preferably greater than or equal to 0.25 N, and more preferably greater than or equal to 0.625 N.

To achieve the above-described object, the method according to the present disclosure for producing a bent optical fiber is a method for producing a bent optical fiber obtained by performing a bending process on a silica optical fiber, and includes a bending step of bending the optical fiber along the contour of the heater by pressing the optical fiber against a heater having arbitrary shape, and a removal step of removing a defect in an inner surface of a bent portion of the bent optical fiber.

Furthermore, the method for producing the bent optical fiber further includes, between the bending step and the removal step, a cooling step of cooling the bent optical fiber obtained at the bending step.

The removal step includes heating the inner surface using a non-contact heat source.

The non-contact heat source can be an arc discharge, or can be laser light.

Furthermore, the removal step includes chemically etching at least a part of the inner surface of the bent portion.

According to the present disclosure, it is possible to achieve a connector with built-in bent optical fibers and a method for producing the said bent optical fiber that is capable of obtaining a highly accurate bent shape and enhancing the strength, and further has good optical propagation characteristics after the removal of a defect.

DETAILED DESCRIPTION

Hereinafter, embodiments of the present disclosure will be described in detail with reference to drawings.

Figure 1A:
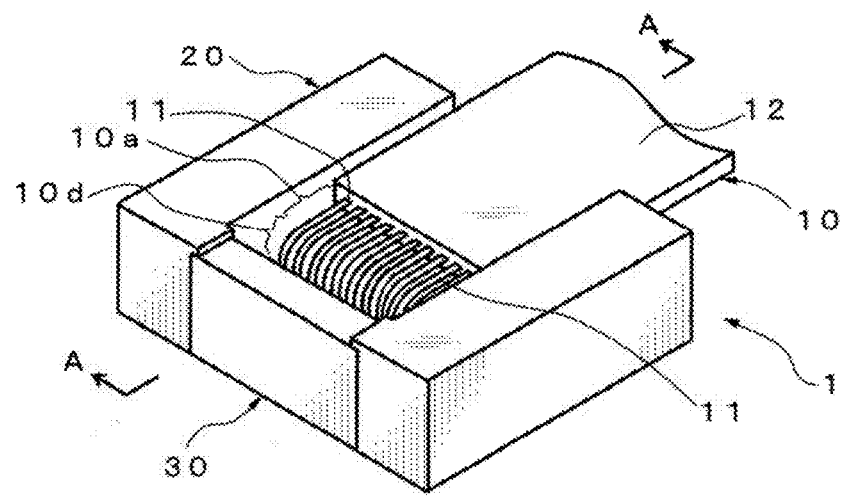
FIGS. 1A and 1B are a perspective view and an exploded perspective view, respectively, schematically showing a configuration of a connector with built-in bent optical fibers according to an embodiment of the present disclosure.
Figure 1B:
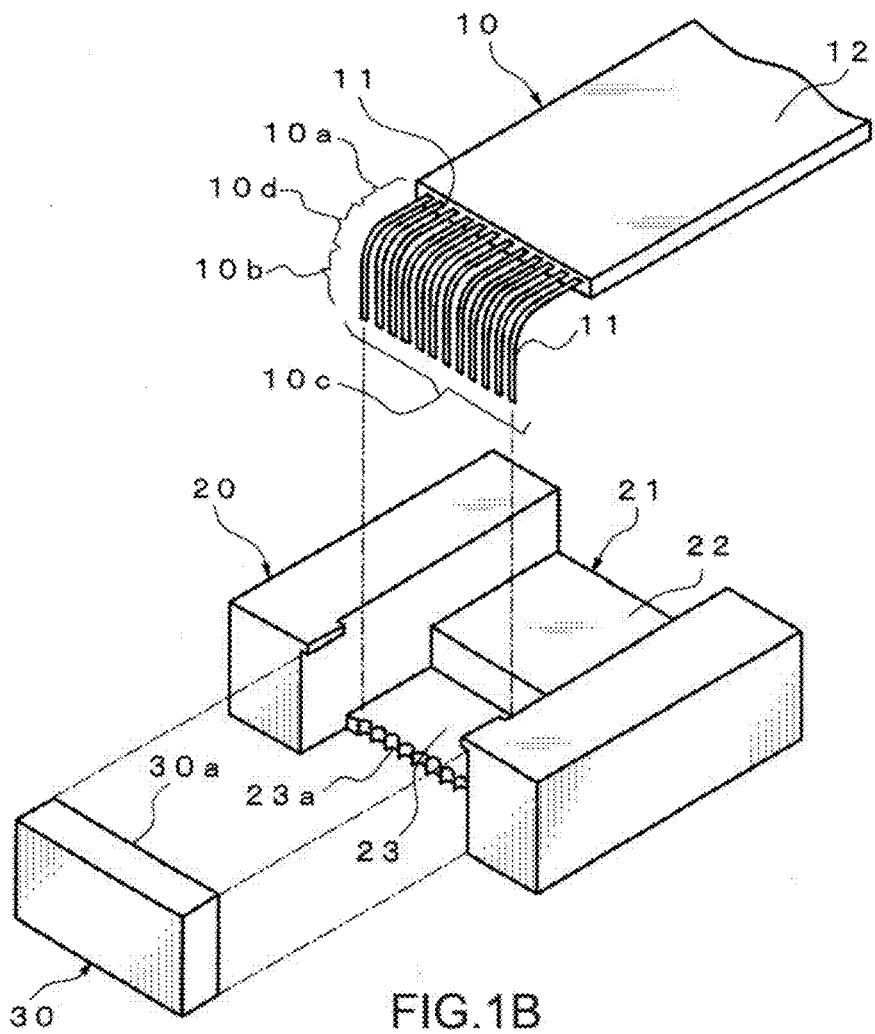

FIGS. 1A and 1B are diagrams schematically showing a configuration of a connector with built-in optical fibers according to an embodiment of the present disclosure; FIG. 1A is a perspective view, and FIG. 1B is an exploded perspective view. The length, width, and thickness of each component in FIGS. 1A and 1B are shown by way of example only, and the length, width, and thickness of each component in the connector with built-in optical fibers of the present disclosure is not limited to those shown in FIGS. 1A and 1B.

As shown in FIGS. 1A and 1B, an optical fiber array 10 includes a plurality of bent optical fibers 11 aligned in a transverse direction, and the bent optical fibers 11 each have a bent portion 10$d$ with a bending angle of 90° between linear portions 10$a$ and 10$b$; the bent portion 10$d$ is formed integrally with the linear portions 10$a$ and 10$b$. An optical fiber outer diameter of the bent portion 10$d$ is smaller than optical fiber outer diameters of the linear portions 10$a$ and 10$b$. The bending angle of the bent portion 10$d$ is not limited to 90°, and is, for example, greater than or equal to 85° and less than or equal to 150°, which is selected in accordance with an optical axis of outgoing/incoming light. The bending angle of the bent portion is defined by an angle between lines extended from the linear portions 10$a$ and 10$b$, respectively. The number of the bent optical fibers 11 is not particularly limited, but is, for example, four or more; here, the number of the bent optical fibers 11 is twelve.

The bent portion 10$d$ of the bent optical fiber 11 has a bend radius of, for example, 5 mm or less, and preferably 3 mm or less. Although a smaller bend radius is preferable in terms of miniaturization, since an excessively small bend radius causes problems of easy breakage and an increase in transmission loss of the optical fiber, the bend radius is preferably greater than or equal to 0.5 mm.

Furthermore, when the bent portion 10$d$ of one bent optical fiber 11 is divided into a plurality of regions along a longitudinal direction at 10°, a variation (maximum-minimum) in bend radius among the plurality of regions excluding regions corresponding to 10° at both ends is less than or equal to 0.3 mm.

An increase in loss of the optical fibers in a connector with built-in bent optical fibers 1 is preferably 1.0 dB or less, and more preferably 0.8 dB or less.

Moreover, in the optical fiber array 10, a variation in bending angle among respective bent portions 10d of the plurality of bent optical fibers 11, i.e., a difference between the maximum angle and the minimum angle among the plurality of bent portions 10d of all the bent optical fibers 11 is within 2.0°, and preferably within 1.0°.

Furthermore, in the case where the number of the plurality of bent optical fibers 11 included in the optical fiber array 10 is four or more, if the strength of the bent portion 10d in each of the plurality of bent optical fibers 11 is greater than or equal to 0.25 N per bent optical fiber by a measurement method to be described later, the bent optical fibers do not easily break during connector assembly. More preferably, with greater than or equal to 0.625 N, the breaking of the bent portion 10d can be further suppressed.

An entire periphery of the linear portion 10a is covered with a covering part 12. The bent optical fibers 11 included in the optical fiber array 10 are, for example, silica optical fibers, and their outer diameter is between 80 μm and 126 μm. In the optical fiber array 10, if the fiber outer diameter is 80 μm, the pitch is, for example, 125 μm or 250 μm, and if the filler outer diameter is 125 μm, the pitch is, for example, 250 μm. The pitch is not limited thereto, and can be set so that the adjacent fibers are not in contact with each other.

Figure 2:
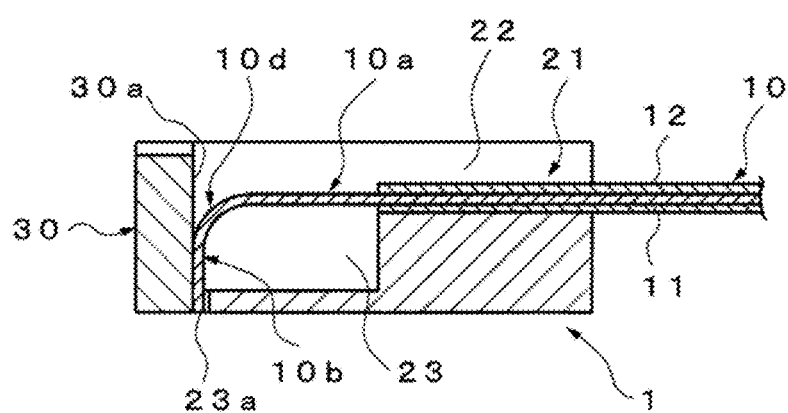
FIG. 2 is a cross-sectional view of the connector with built-in bent optical fibers along a line A-A in FIG. 1A.

The connector with built-in bent optical fibers 1 includes, as shown in FIG. 2, the optical fiber array 10 including the plurality of bent optical fibers 11 each having the bent portion 10d; a ferrule 20 supporting the one linear portions 10a of the optical fiber array 10 and also supporting the other linear portions 10b; and a plate member 30 supporting the side surfaces of the linear portions 10b in cooperation with the ferrule 20.

The ferrule 20 has a groove 21 formed therein along an axial direction of the linear portions 10a, and the covering part 12 is accommodated in the groove 21. Specifically, the groove 21 has a shallow groove portion 22 and a deep groove portion 23. The shallow groove portion 22 supports the linear portions 10a, and the deep groove portion 23 supports the linear portions 10b. A plurality of grooves 23a are formed on a side surface of the deep groove portion 23, and the plurality of grooves 23a are formed to have such a dimension that allows the grooves 23a to accommodate the bent optical fibers 11, respectively. Furthermore, the grooves 23a are capable of supporting end portions of the linear portions 10b of the bent optical fibers, respectively.

The plate member 30 is disposed further outward of the side surface of the deep groove portion 23. A side surface 30a of the plate member 30 supports the linear portions 10b of the optical fiber array 10, thus positioning the optical fiber array 10 in the longitudinal direction. In this way, the grooves 23a and the plate member 30 are included in a plurality of positioning mechanisms that position respective end portions 10c of the plurality of bent optical fibers 11.

Furthermore, a resin portion filled with resin (not shown) is provided on the outer periphery of the bent portions 10d.

Figure 3:
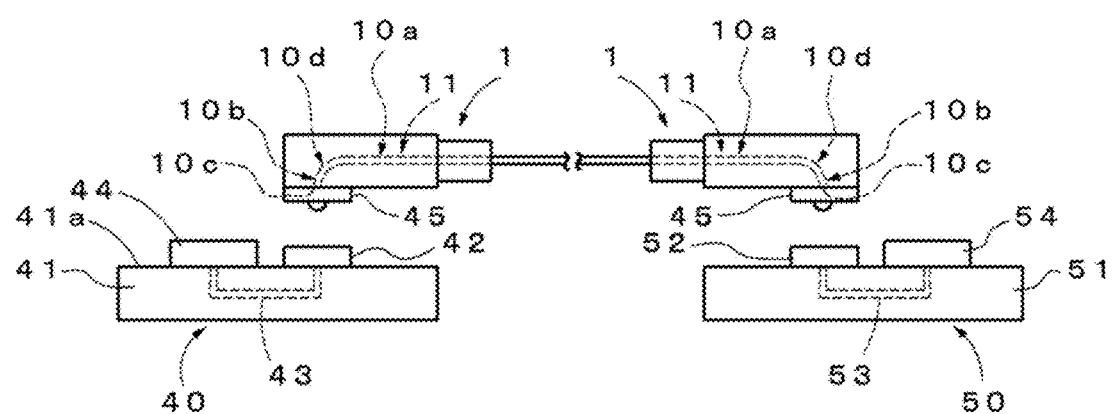
FIG. 3 is a side view showing a state where the connector with built-in bent optical fibers according to the embodiment of the present disclosure is mounted on a circuit board.

The connector with built-in optical fibers 1 configured as above is, for example, as shown in FIG. 3, mounted on a VCSEL 42 having a light-emitting surface 42a which is parallel to a principal surface 41a of a circuit board 41 in a transmitting-side circuit 40(Tx). The VCSEL 42 is electrically connected to an IC 44 through an electrical wiring 43 in the circuit board 41. An emitted light from the VCSEL 42 is input to the end portions 10c of the linear portions 10b through a lens array 45. The light input to the end portions 10c passes through the linear portions 10b and the bent portions 10d, and is transmitted to the linear portions 10a, and then is input from the linear portions 10 to the connector with built-in optical fibers 1 of a receiving-side circuit 50(Rx). In the receiving-side circuit 50, the emitted light from the VCSEL 42 passes through the linear portions 10a, the bent portions 10d, the linear portions 10b, and the end portions 10c of the connector, and is input to a photodiode 52 on a circuit board 51. Then, an electrical signal in response to the light input to the photodiode 52 is input to an IC 54 through an electrical wiring 53 in the circuit board 51.

Figure 4A:
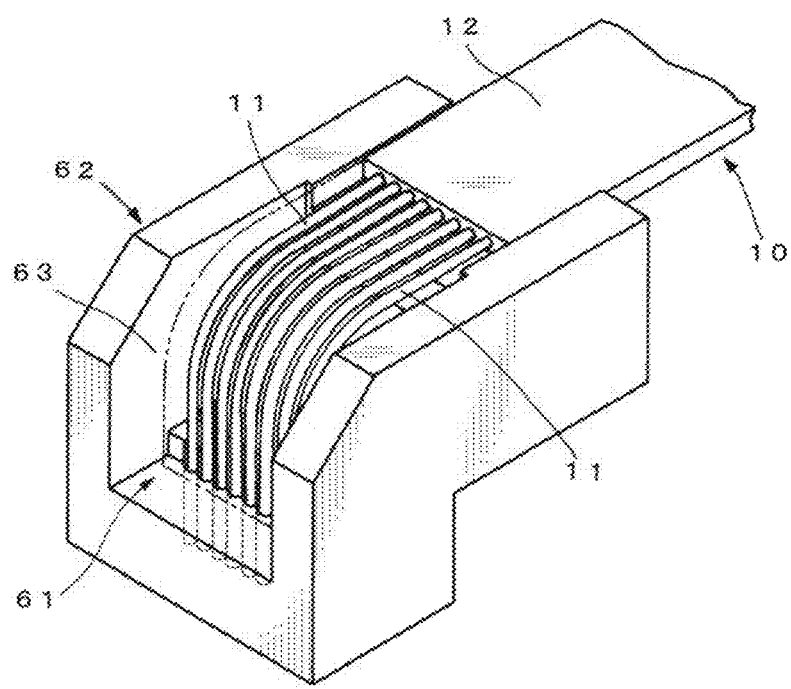
FIGS. 4A and 4B are a perspective view and an exploded perspective view, respectively, schematically showing a modification of the connector with built-in bent optical fibers according to the embodiment of the present disclosure.
Figure 4B:
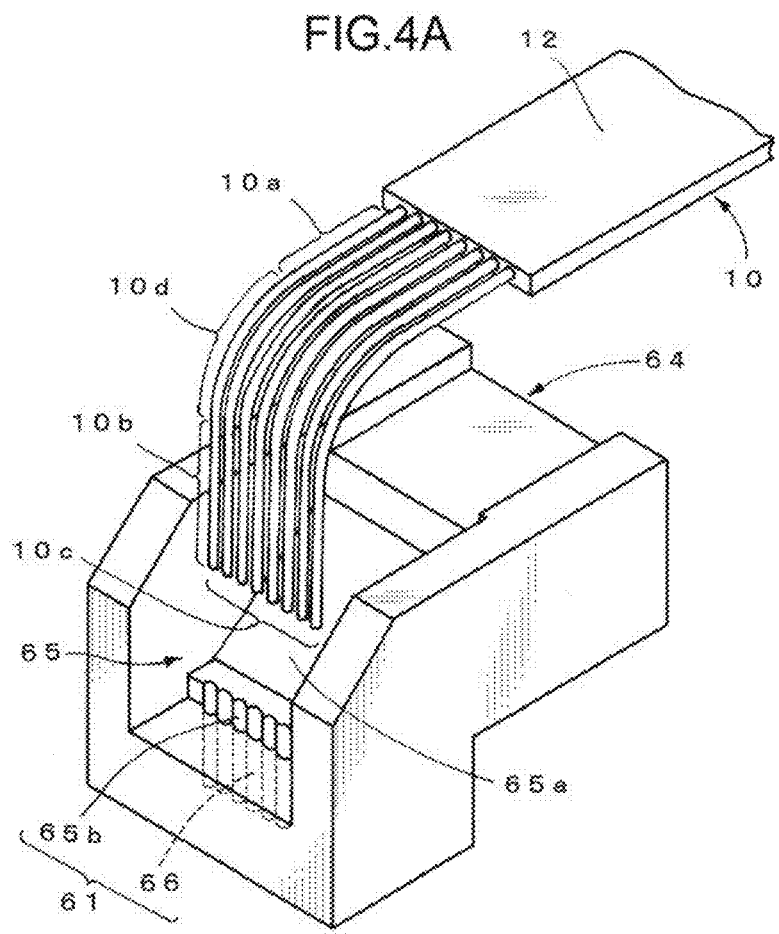

FIGS. 4A and 4B are diagrams schematically showing a modification of the connector with built-in optical fibers 1 according to the embodiment of the present disclosure. FIG. 4A is a perspective view, and FIG. 4B is an exploded perspective view.

As shown in FIGS. 4A and 4B, a connector with built-in optical fibers 60 includes the optical fiber array 10 that includes a plurality of bent optical fibers each having the bent portion 10d; a ferrule 62 that has a plurality of positioning mechanisms 61 for aligning the end portions 10c of the plurality of bent optical fibers 11, respectively; and a resin portion 63 that fills the outer periphery of the bent portions 10d. The ferrule 62 is an integrally-molded member that has a substantially L-shape in cross-section. The ferrule 62 has a groove portion 64 formed therein along the axial direction of the linear portions 10a (FIG. 4B), and the covering part 12 is accommodated in the groove portion 64.

Furthermore, the ferrule 62 is provided with a groove portion 65 formed so as to communicate with the groove portion 64, and the bent portions 10d are accommodated in the groove portion 65. The groove portion 65 has an inclined bottom surface 65a, and a plurality of grooves 65b are formed at an end portion of the bottom surface 65a. The plurality of grooves 65b are formed to have such a dimension that allows the grooves 65b to accommodate the bent optical fibers 11, respectively. Moreover, a plurality of through-holes 66 corresponding to the plurality of grooves 65b are formed in the ferrule 62, and the linear portions 10b of the bent optical fibers 11 are inserted into the plurality of through-holes 66, respectively. The plurality of grooves 65b and the plurality of through-holes 66 are included in the positioning mechanisms 61. Accordingly, the linear portions 10b of the bent optical fibers 11 are supported by the ferrule 62 with the end portions 10c being exposed to the outside, and the plurality of bent optical fibers 11 are positioned in the ferrule 62 by the positioning mechanisms 61.

The dimension of the connector with built-in optical fibers 60 is, for example, 3.5 mm thick, 3.7 mm wide, and 6.0 mm long. Furthermore, in the connector with built-in optical fibers 60, the bent optical fibers 11 are bent, for example, with a bend radius of R=2.5 mm, and, for example, through a bending angle of 98°. The bending angle of the bent portions 10d is greater than or equal to 85° and less than or equal to 150°, and preferably greater than or equal to 90° and less than or equal to 105°. This can make the bent optical fibers low-profile, and miniaturization of the connector with built-in optical fibers 1 can be achieved.

Figure 5:
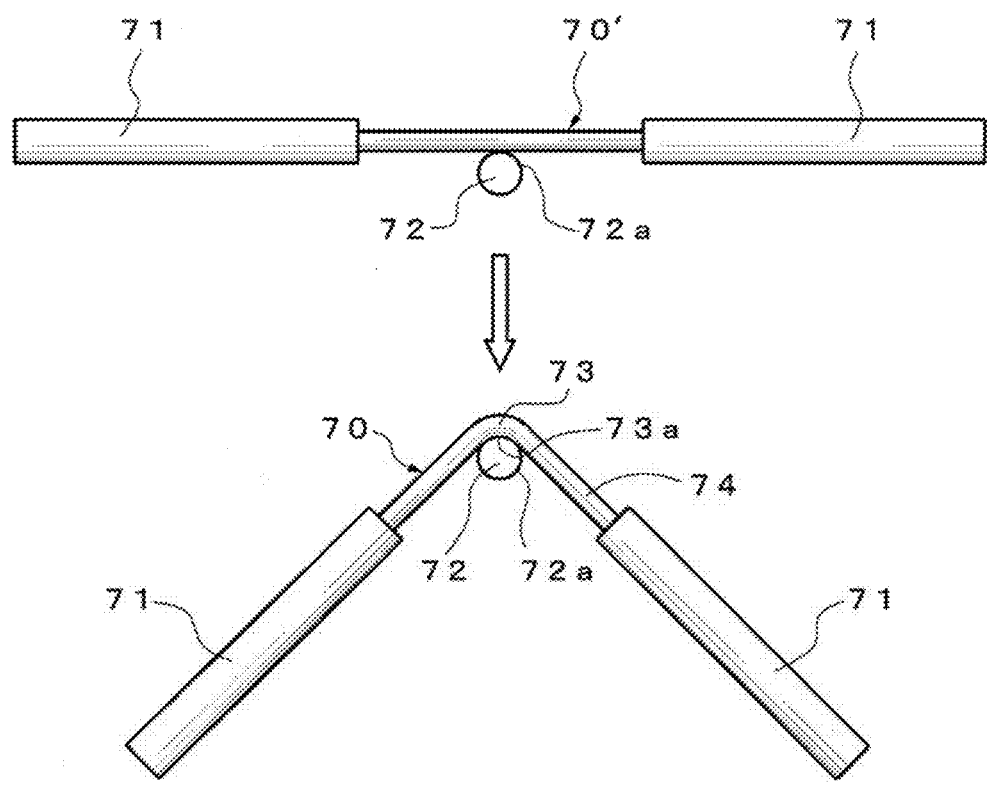
FIG. 5 is a diagram illustrating a heating step in a method for producing a bent optical fiber.
Figure 6A:
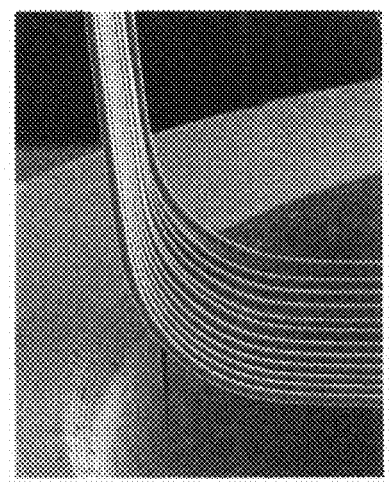
FIG. 6A is an image of an entire bent portion of the bent optical fiber after the heating step shown in FIG. 5.

The bent optical fibers 11 are produced, for example, through the following steps. First, as shown in FIG. 5, a portion of an optical fiber 70', which is exposed by removing a covering part 71, is pressed against an outer peripheral surface 72a of a heater 72 having a substantially cylindrical shape, and then the optical fiber 70' is bent through an angle of about 90° along the contour of the heater 72 by applying heat from the heater 72 (a bending step). At this time, the bent portion has a shape of a continuous curve along the longitudinal direction. Thereafter, the bent optical fiber 70 is cooled to room temperature (a cooling step). Through the heating step and the cooling step, the bent optical fiber 70 having a bent portion 73 is formed (FIG. 6A).

Figure 6B:
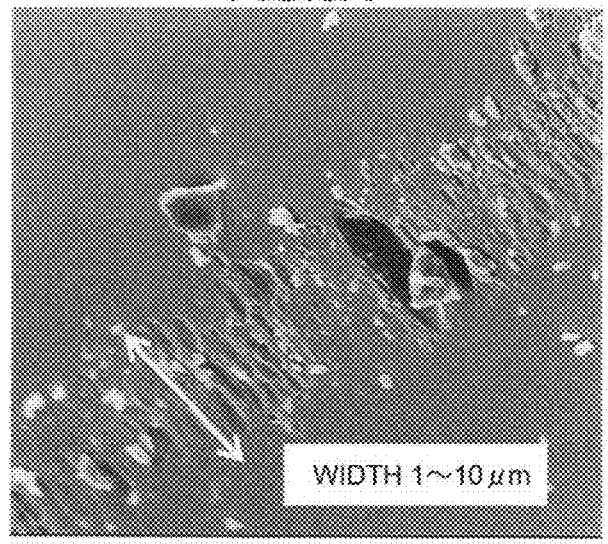
FIG. 6B is an enlarged image of an inner surface of the bent portion shown in FIG. 6A.

By observing a photomicrograph of the bent portion 73 immediately after the bending step, it can be seen that, on an inner surface 73a of the bent portion 73 of the optical fiber 70 in contact with the heater 72, multiple minute scratches (defects) are formed along a radial direction of the bent optical fiber (FIG. 6B). The cross-sectional shape of the heater 72 may be a round shape or an elliptical shape. However, whatever the shape, minute scratches are generated on a contact surface of the bent optical fiber 70 with the heater 72 as long as the bent optical fiber 70 comes in contact with the heater 72. The length of the minute scratches is, for example, 1 µm to 10 µm. Such minute scratches becomes starting points of cleavages of the bent optical fiber, and the bent optical fiber easily breaks with a small shock or tensile and bending stresses, and therefore the strength of the optical fiber is significantly reduced.

Figure 6C:
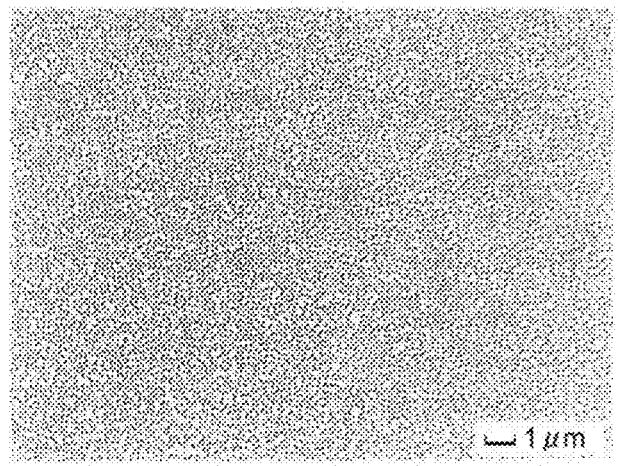
FIG. 6C is an enlarged image of the inner surface after a removal step.

Accordingly, to remove such minute scratches, the inner surface 73a of the bent portion 73 of the bent optical fiber 70 is heated, and thus the minute scratches on the inner surface are removed (a removal step). As an example of a method of removing the minute scratches, there is a method of heating the inner surface 73a, i.e., an inner peripheral surface of the bent portion 73 using a non-contact heat source. With the inner surface 73a of the bent optical fiber 70 being heated with the non-contact heat source, the inner surface 73a of the bent optical fiber 70 heated to a prescribed temperature or higher melts, and most of the minute scratches generated on the inner surface 73a disappear (FIG. 6C). As a result, the starting point of cleavage is eliminated, and the strength of the optical fiber can be increased.

At this time, the cross-sectional shape of a heated portion of the bent optical fiber 70, i.e., the bent portion 73 is not a circular shape anymore, and the inner surface 73a is hollowed a little by melting; therefore, the cross-sectional shape of the bent portion 73 becomes a substantially elliptical shape, where the direction connecting the inner surface and the outer surface of the bent portion is the minor axis, and the major axis is along the direction perpendicular to the minor axis. In this way, since the cross-sectional shape of the bent portion 73 is deformed, the strength against bending is further increased.

Here, the dimension of the major axis is about the same as the original optical fiber diameter, but the dimension of the minor axis is decreased by about 1 µm to 2 µm from the original optical fiber diameter. If the degree of reduction in the optical fiber diameter is too small, an effect of improving the strength against bending is not achieved. Therefore, the dimension of the minor axis is reduced preferably by at least 0.5 µm from the original optical fiber diameter. However, if the degree of reduction is too large, the tensile strength is lowered, which makes it difficult to handle the fiber. Therefore, it is preferable that the length of the minor axis is 70 µm or more.

Examples of the non-contact heat source include arc discharge, laser light, a gas burner, and the like. To prevent the composition (for example, a refractive index distribution or the like) of a core part of the bent optical fiber 70 from being changed by high heat, it is preferable to use arc discharge or laser light as a heat source. Furthermore, a gas burner is a simple device, and has an advantage that the bent optical fiber 70 can be heated at a low cost.

Application of heat by arc discharge or laser light is suitable for accurately controlling the temperature distribution of a heating space or the application time, and it is possible to apply high heat only to the inner surface 73a having minute scratches or the vicinity thereof. Accordingly, a defect can be removed without impairing the fiber characteristics, and the strength of the bent optical fiber can be increased.

Figure 7:
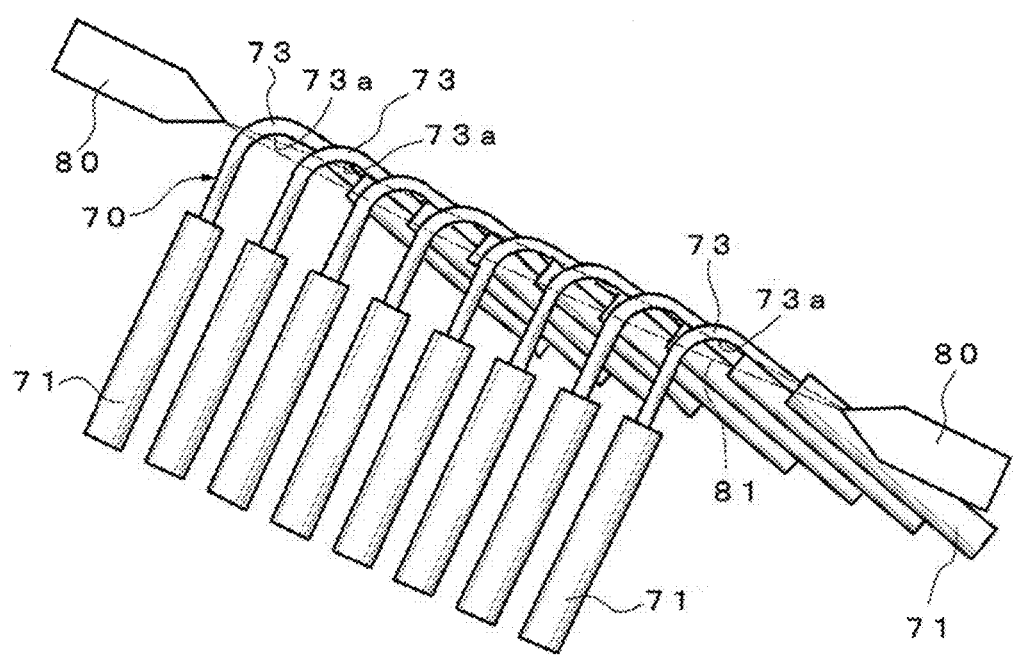
FIG. 7 is a diagram illustrating the removal step using arc discharge as an example of one step in the method for producing the bent optical fiber.

In a case where an arc discharge is used as the non-contact heat source, specifically, as shown in FIG. 7, a pair of electrodes 80 and 80 are placed on both sides of a plurality of (in an example of FIG. 7, eight) bent optical fibers 70 aligned in a transverse direction. Then, the pair of electrodes 80 and 80 are placed in such a manner that an arc discharge region 81 is located on a center of curvature side of the inner surfaces 73a of the bent portions 73, and an electric discharge is performed between the pair of electrodes.

Figure 8A:
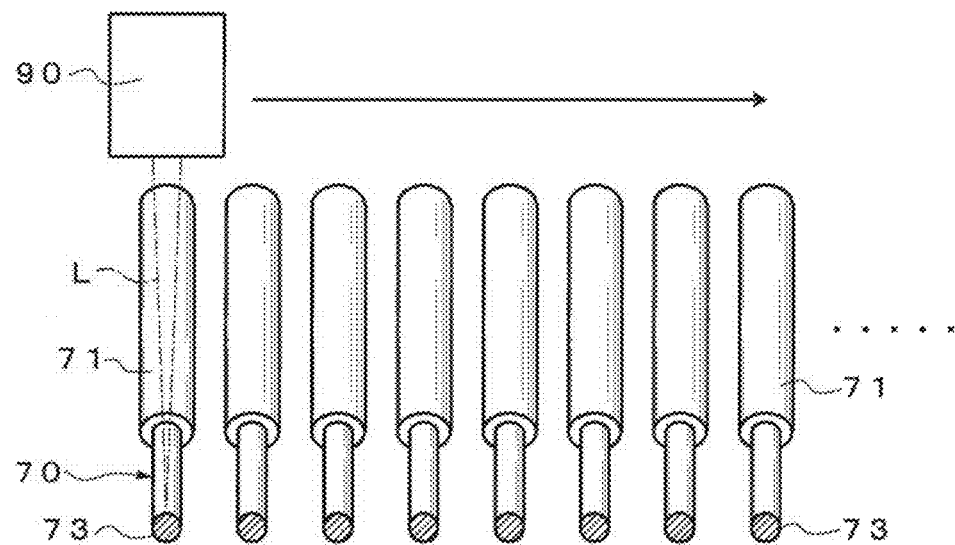
FIG. 8A is a diagram illustrating the removal step using laser light as an example of one step in the method for producing the bent optical fiber.
Figure 8B:
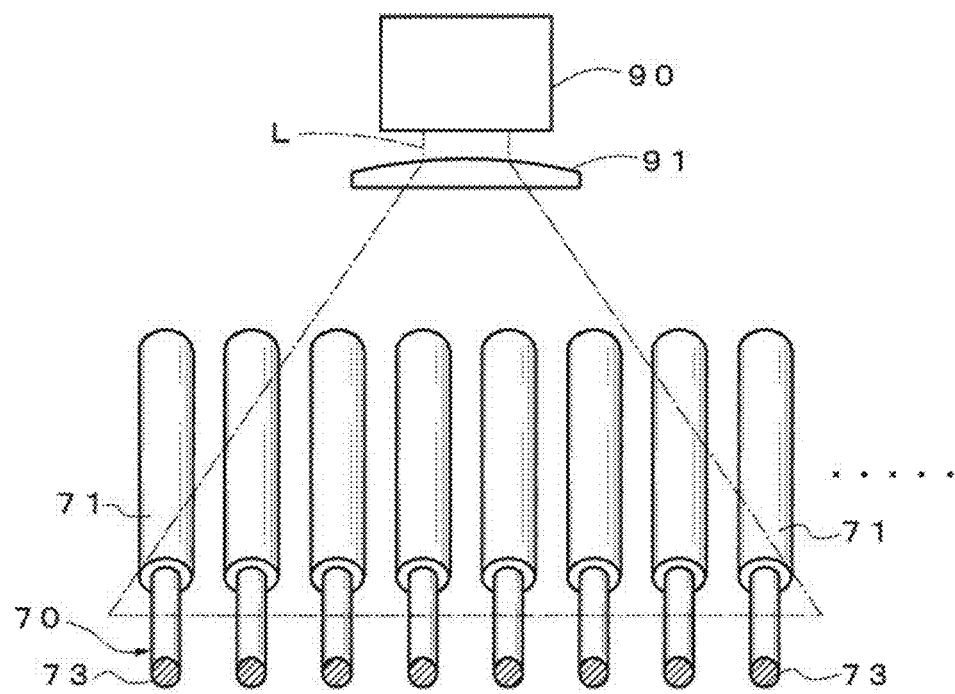
FIG. 8B is a diagram illustrating another form of the removal step using laser light.

Furthermore, in the case where the number of the bent optical fibers is large (for example, eight or more), as shown in FIGS. 8A and 8B, it is preferable to use a laser light L as the non-contact heat source. The laser light L is preferably a CW laser (a continuous wave laser) that continuously emits light from a light source 90. Moreover, examples of the laser light L include a $CO_2$ laser, a YAG laser, a fiber laser, etc. Preferably, the laser light L is a $CO_2$ laser.

To remove minute scratches, a portion of the optical fiber having the minute scratches needs to be heated and melted as described above. Therefore, it is preferable generate heat by to irradiate the portion with a laser light, thereby heating the portion. From this perspective, a $CO_2$ laser is preferable.

By observing a microscope image of the inner surface 73a of the bent portion 73 after the minute scratches have been removed by the laser light L, it can be seen that the inner surface 73a becomes a satin finished surface as shown in FIG. 6C. Accordingly, the minute scratches that is a starting point of cleavage are removed, and the strength of the optical fiber is increased.

Further, at this time, heating is performed while adjusting the bending angle to be an intended angle. For example, with the bent optical fiber 70 being set on a fixing tool for fixing the bent optical fiber 70 at a predetermined angle, the bent optical fiber is heated. Accordingly, the angle of the bent optical fiber 70 is corrected and is brought closer to an intended angle, and the variation in the bending angle can be further reduced (within 1.0°).

At the heating step using arc discharge or laser irradiation, heating conditions need to be determined so as not to change the refractive index of the core part of the bent optical fiber 70 while supplying heat necessary for removal of the minute scratches to the inner surface 73a of the bent portion 73. This is because if the core part of the bent optical fiber is also heated, and the constituent of the core is diffused and the refractive index is changed, the transmission characteristics may be degraded.

The arc discharge or laser irradiation can be performed while moving either the heat source or the optical fiber or both of them. That is, it can be performed by relatively moving both the laser light and the optical fiber.

Furthermore, in the laser irradiation, the fibers may be sequentially heated one by one by relatively moving the laser light and the optical fiber to trace the inner surfaces 73a of the bent portions 73 in the longitudinal direction of the fiber. By heating the bent portions in this manner, the minute scratches of each fiber can be certainly removed.

Moreover, as shown in FIG. 8B, by using a cylindrical lens 91 or the like, the laser light L can be concentrated to a linear laser light substantially parallel to the radial direction of the optical fibers. By using the linear laser light, as compared to a spot-like laser light, a wider range can be heated, and the minute scratches can be melted in a shorter time.

Figure 10:
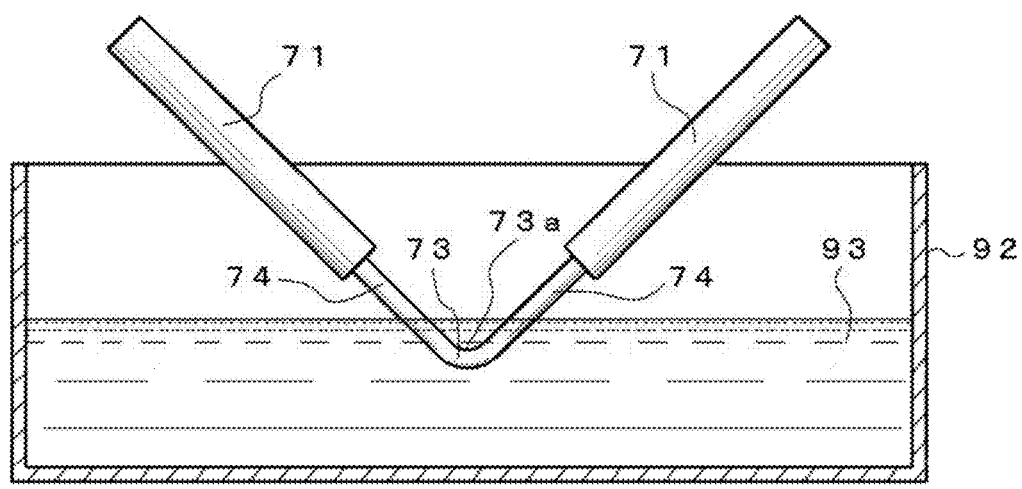
FIG. 10 is a diagram illustrating the removal step by chemical etching as an example of one step in the method for producing the bent optical fiber.

Furthermore, as another example of the method for removing the minute scratches, at least a part of the inner surface 73a of the bent portion 73 can be chemically etched as shown in FIG. 10. As a method of chemical etching, for example, a solution 93 containing a chemical capable of eroding a silica material is put into a container 92, and the bent portion 73 is soaked in the solution 93 for a predetermined period of time, and the inner surface 73a of the bent portion 73 is melted, thereby the minute scratches formed on the inner surface can be removed. Types of the solution 93 include, for example, hydrofluoric acid. Also in the case of removing the minute scratches by chemical etching, only the inner surface 73a is melted by erosion, and the core part is not eroded. Therefore, it is possible to prevent degradation of the transmission characteristics due to transition of the core constituent.

Figure 9:
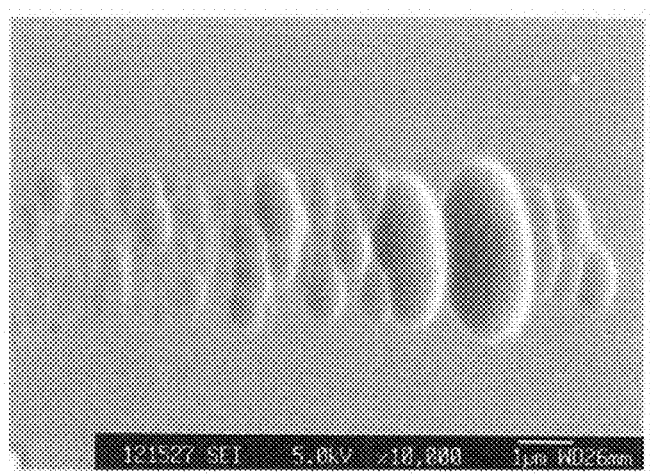
FIG. 9 is a microscopic image of the bent portion when minute scratches are removed by the laser light.

Furthermore, even if marks are left, these are substantially elliptically rounded roughness without any sharp portions, and these are not the minute scratches that are starting points of cleavage (FIG. 9). As a result, the starting points of cleavage is eliminated, and the strength of the bent optical fiber can be increased.

At this time, the fiber outer diameter of the bent portion is reduced by about 1 µm to 2 µm by the chemical etching. If the fiber diameter is reduced, the tensile strength is somewhat lowered. However, the strength against bending (the bending strength) is increased. Accordingly, the strength against bending is further increased.

If the degree of reduction in the optical fiber diameter is too small, an effect of improving strength against bending is not achieved. Therefore, preferably, the optical fiber diameter is reduced by at least 0.5 µm from the original optical fiber diameter. However, if the degree of reduction is too large, a tensile strength is lowered, which makes it difficult to handle the fiber. Therefore, it is preferable that the optical fiber diameter is 70 µm or more.

(Measurement of Bend Radius of Bent Portion)

One bent optical fiber 11 was bent through an angle of 90° using an arc discharge, and a variation in the radius of a bent portion of the optical fiber was measured. Furthermore, one optical fiber was bent through an angle of 90° by pressing the optical fiber against a heater, and a variation in the radius of a bent portion of the optical fiber was measured.

Figure 11A:
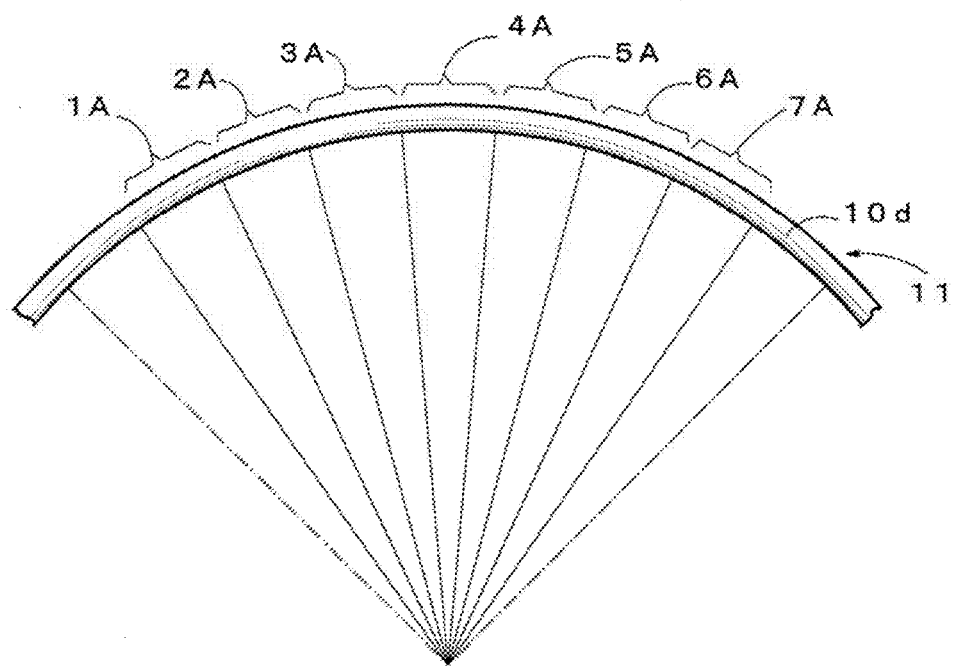
FIG. 11A is a diagram showing bend radius measurement regions illustrating the variation in bend radius of the bent portion of one optical fiber, and FIG. 11 B is a graph showing results of the measurement of the variation in bend radius of the bent portion of one optical fiber.
Figure 11B:
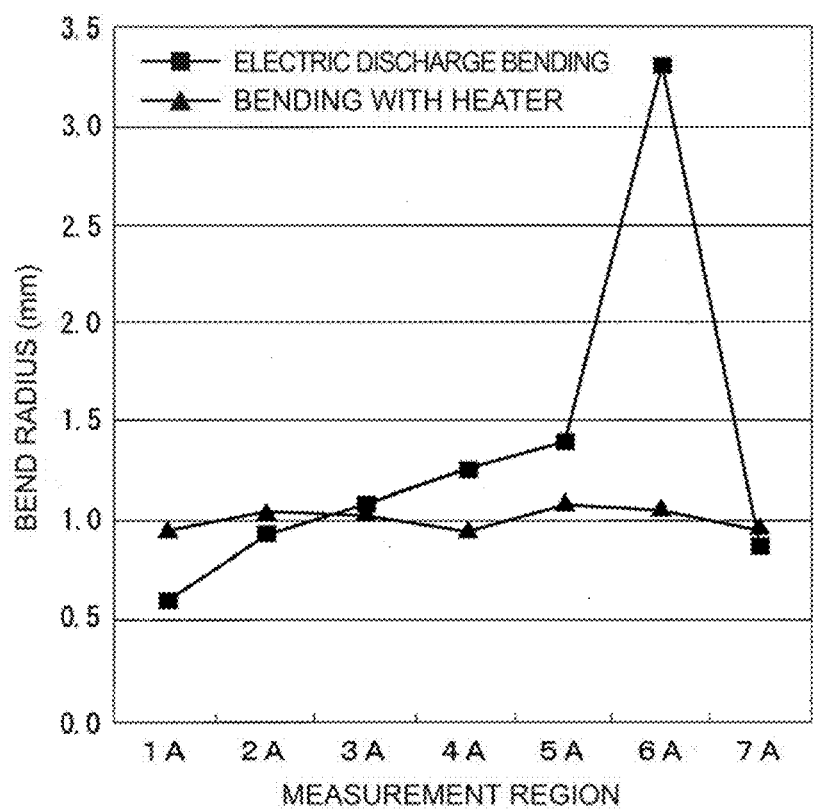
Figure 12:
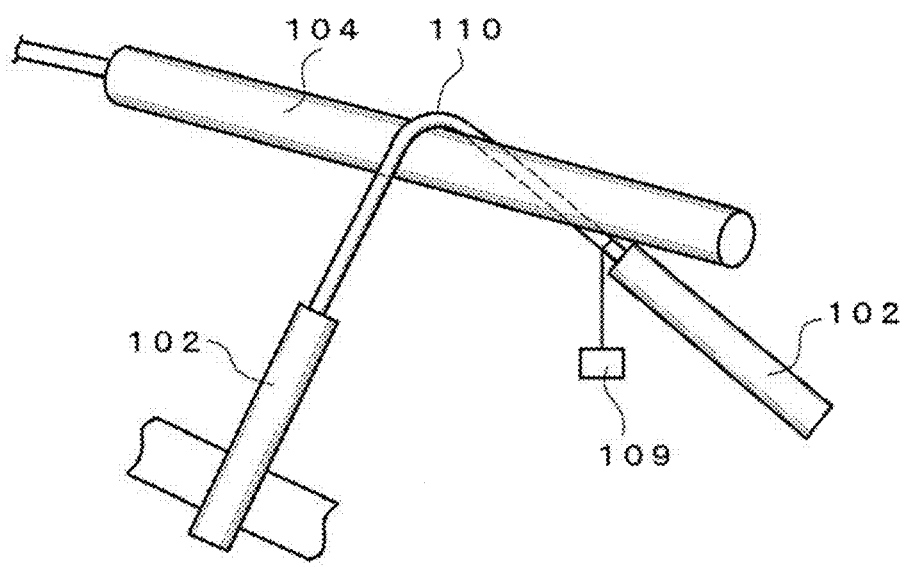
FIG. 12 is a perspective view illustrating a conventional method for producing a bent optical fiber.
Figure 13:
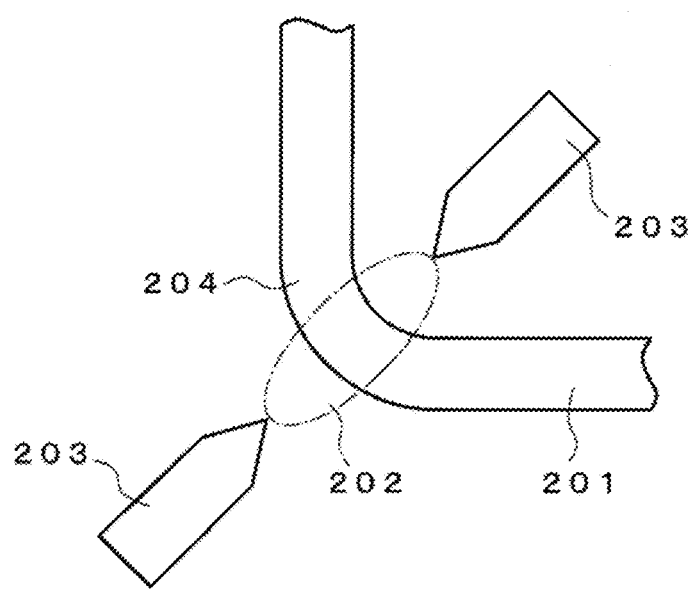
FIG. 13 is a perspective partial view illustrating another conventional method for producing a bent optical fiber.

Specifically, as shown in FIG. 11A, a range of 10° to 80° in the bent portion 10d was divided into regions 1A to 7A at 10°, and the bend radius of each region was measured. A target value of the bend radius was set to 1 mm for both bending by discharge and bending by heater. Results are shown in Table 1 and FIG. 11B.

TABLE 1

| Measurement Region | Bend Radius by Electric Discharge Bending (mm) | Bend Radius by Bending with Heater (mm) |
|---|---|---|
| 1A | 0.63 | 0.96 |
| 2A | 0.96 | 1.06 |
| 3A | 1.11 | 1.03 |
| 4A | 1.24 | 0.97 |
| 5A | 1.39 | 1.1 |
| 6A | 3.3 | 1.07 |
| 7A | 0.88 | 0.98 |

As shown in Table 1, in a heating process, a substantially uniform bend radius was obtained from the regions 1A to the regions 7A, and a variation (maximum-minimum) in the bend radius among the regions 1A to 7A was 0.14 mm, which is within a range of less than or equal to 0.3 mm. On the other hand, in the arc discharge, there was a large bend radius in some regions (for example, the region 6A), and there was a variation in the bend radius. Furthermore, in the heating process, since a fiber was bent along the shape of the heater having a substantially circular cross-section, a uniform and desired bend radius was obtained easily and stably. However, in the arc discharge, the bend radius was determined based on heating conditions only, and therefore there was some variation. Accordingly, it can be seen that the heater treatment is preferable to obtain the uniform and intended bend radius stably.

(Measurement of Bending Angle of Bent Portion)

Using optical fiber arrays in which eight bent optical fibers 11 were aligned in the transverse direction, twenty-three optical fiber arrays were fabricated. A target value of the angle of the bent portion of each optical fiber was 98°.

First, a bent portion 73 was formed in an optical fiber 70' by pressing the optical fiber against a heater 72 having a substantially circular cross-section and bending the optical fiber along the contour of the heater 72. The bend radius was set to 2.5 mm.

Then, an optical fiber having the maximum angle and an optical fiber having the minimum angle were selected from the eight optical fibers in each optical fiber array, and a difference in angles (°) between them was found, and an average value of respective bending angles of the eight optical fibers included in the optical fiber array was found. In the measurement of the angle difference, generally, two optical fibers located at both ends of the eight fibers (1 ch to 8 ch) have the maximum angle (=1 ch) and the minimum angle (=8 ch). Therefore, in this measurement, respective angles (°) of the optical fibers (1 ch and 8 ch) located at both ends were measured, and a difference between them was found. Results are shown in Table 2.

TABLE 2

| | Before Laser Treatment | | | | After Laser Treatment | | | |
|---|---|---|---|---|---|---|---|---|
| No. | 1ch deg. (°) | 8ch deg. (°) | Angle Difference between 1ch and 8ch deg. (°) | Average Value deg. (°) | 1ch deg. (°) | 8ch deg. (°) | Angle Difference between 1ch and 8ch deg. (°) | Average Value deg. (°) |
| 1  | 95.15  | 94.91  | 0.24 | 95.03  | 99.00 | 98.26 | 0.74 | 98.63 |
| 2  | 95.12  | 95.2   | 0.08 | 95.16  | 98.07 | 98.16 | 0.09 | 98.12 |
| 3  | 96.38  | 95.51  | 0.87 | 95.95  | 97.75 | 97.25 | 0.50 | 97.50 |
| 4  | 95.93  | 96.04  | 0.11 | 95.99  | 97.01 | 97.09 | 0.08 | 97.05 |
| 5  | 96.20  | 95.85  | 0.35 | 96.03  | 96.84 | 96.58 | 0.26 | 96.71 |
| 6  | 96.46  | 96.84  | 0.36 | 96.66  | 98.50 | 98.74 | 0.24 | 98.62 |
| 7  | 97.60  | 96.35  | 1.25 | 96.96  | 97.95 | 97.17 | 0.78 | 97.56 |
| 8  | 97.28  | 96.68  | 0.80 | 96.98  | 97.75 | 97.24 | 0.51 | 97.50 |
| 9  | 97.08  | 97.14  | 0.08 | 97.11  | 96.88 | 96.74 | 0.14 | 96.81 |
| 10 | 97.70  | 96.89  | 0.81 | 97.30  | 98.13 | 98.03 | 0.10 | 98.08 |
| 11 | 97.70  | 97.51  | 0.19 | 97.61  | 96.58 | 96.60 | 0.02 | 96.69 |
| 12 | 97.63  | 97.97  | 0.34 | 97.80  | 97.27 | 96.80 | 0.47 | 97.04 |
| 13 | 97.63  | 98.38  | 0.75 | 98.01  | 97.92 | 98.09 | 0.17 | 98.01 |
| 14 | 98.20  | 98.42  | 0.22 | 98.31  | 97.20 | 96.98 | 0.22 | 97.09 |
| 15 | 98.80  | 98.18  | 0.62 | 98.49  | 97.97 | 97.97 | 0.00 | 97.97 |
| 16 | 98.68  | 98.36  | 0.32 | 98.52  | 98.07 | 98.00 | 0.07 | 98.04 |
| 17 | 100.25 | 98.69  | 1.56 | 99.47  | 99.16 | 99.01 | 0.15 | 99.09 |
| 18 | 99.96  | 99.06  | 0.90 | 99.51  | 98.77 | 98.40 | 0.37 | 98.59 |
| 19 | 99.92  | 99.23  | 0.69 | 99.58  | 99.20 | 98.90 | 0.30 | 99.05 |
| 20 | 100.71 | 99.56  | 1.15 | 100.14 | 98.84 | 98.63 | 0.21 | 98.74 |
| 21 | 100.59 | 100.87 | 0.28 | 100.73 | 99.19 | 99.03 | 0.16 | 99.11 |
| 22 | 101.34 | 100.18 | 1.16 | 100.76 | 99.38 | 99.21 | 0.17 | 99.30 |
| 23 | 101.59 | 100.2  | 1.39 | 100.90 | 99.32 | 98.76 | 0.56 | 99.04 |

As shown in Table 2, before the laser treatment, the difference between the maximum angle and the minimum angle (the angle difference between 1 ch and 8 ch) in the eight optical fibers of each optical fiber array was 1.56° (No. 17) at a maximum that was within a range of 2.0° or less, and an average value of the angle differences in all the optical fiber arrays (No. 1 to No. 23) was 0.62°. Furthermore, the angles of the bent portions of all the optical fibers were within a range of 94.91° to 101.59°.

Next, the inner surface 73a of the bent portion 73 was fixed to a fixing tool and was heated by a $CO_2$ laser, and minute scratches on the inner surface 73a were removed. Measurement results after the laser treatment are shown in Table 2. When the minute scratches had been removed, the difference between the maximum angle and the minimum angle in the bent portions of the eight optical fibers was 0.78° (No. 7) at a maximum that was within a range of 1.0° or less, and an average value of the angle differences in all the optical fiber arrays was 0.27°. Furthermore, the angles of the bent portions of all the optical fibers were within a range of 98°±1.5°.

Accordingly, by performing the laser treatment, the variation in the angles of the bent portions of the optical fibers was small, and it was possible to fabricate the optical fiber arrays with high accuracy of the positions of the plurality of optical fibers.

(Measurement of Strength of Bent Portion)

Samples of optical fiber arrays in which eight bent optical fibers 11 are aligned in the transverse direction, and a bent portion with R=1 mm and a bending angle of 90° are formed at the center of each optical fiber were prepared, and the measurement of the strength was performed.

The samples were formed by pressing each optical fiber against the heater 72 having a substantially circular cross-section and bending the optical fiber along the contour of the heater 72, and a covering of a 10-mm portion of the optical fiber located at the midsection of the optical fiber array was removed, while the remaining portions of the glass optical fiber had a covering formed on the outer periphery thereof. The outer diameter of a linear portion of a bent optical fiber was about 125 μm (between 124 μm and 126 μm), and the cross-sectional shape of a bent portion of the bent optical fiber subjected to the removal of scratches using a laser was a substantially elliptical shape with the inner surface being scraped by 1.5 μm from a circular shape. The outer diameter of a bent optical fiber subjected to the removal of scratches using hydrofluoric acid was thinner by 1.5 μm in diameter than the linear portion.

Then, (a) ten bent optical fibers not subjected to the removal of minute scratches, (b) ten bent optical fibers subjected to the removal of scratches using a laser, and (c) ten bent optical fibers subjected to the removal of scratches using hydrofluoric acid were prepared.

In the measurement of the strength, a strength tester (manufactured by A&D Company, Ltd., Name of Tester "TENSIRON") was used. Conditions of the measurement were gripping position at a 40-mm position from the bent portion, initial inter-grip distance of 700 mm, pulling rate of 50 mm/min, and load cell of 5 kg (up to 50 N).

Specifically, both ends of an optical fiber array were gripped by gripping tools placed to face each other across a distance of 700 mm, respectively, and it was set such that the length from one of the gripped portions of the optical fiber array to the other gripped portion was 700 mm.

Then, in a state where one of the gripped portions was fixed, the other gripped portion was elevated at a rate of 50 mm/min, and a bent portion was given a load in a direction of extension of the bent portion, and then a load at which the bent portion was entirely broken was measured. A target value of a breaking load was set to 2 N (0.25 N×8). In the present example, the measurement including not only the tensile strength but also parameters of the bending strength was performed.

As a result, the optical fibers not subjected to the removal of minute scratches were broken at 0.03 N on average. On the other hand, the optical fibers subjected to the removal of scratches using the laser were broken at 7.4 N on average, and the optical fibers subjected to the removal of scratches using hydrofluoric acid were broken at 2.1 N on average. To convert to the strength per fiber, the optical fibers subjected to the removal of scratches using the laser had a strength of 0.925 N on average, which is within a range of greater than or equal to 0.625 N, and the optical fibers subjected to the removal of scratches using hydrofluoric acid had a strength of 0.2625 N on average, which is within a range of greater than or equal to 0.25 N.

Accordingly, by removing minute scratches of a bent portion using a laser or hydrofluoric acid, the strength was sufficiently ensured, and it was possible to a bent optical fiber in which the angle of a bent portion thereof was a desired angle and had a small variation in the angle of the bent portion.

As described above, according to the present embodiment, the bent portion 73 is formed by pressing the optical fiber 70' against the heater 72 having a substantially circular cross-section and bending the optical fiber along the contour of the heater 72. Therefore, the uniform and desired bend radius can be obtained easily and stably.

Furthermore, thereafter, minute scratches on the inner surface 73a of the bent portion 73 are removed. Therefore, the minute scratches that cause stress concentration are removed, and the mechanical strength can be improved.

Moreover, in the embodiment in which the bent portion 73 is heated when removing minute scratches, the entire bent portion 73 is not heated, but a portion of the bent portion 73, i.e., the inner surface 73a where the minute scratches caused by contact with the heater 72 are located heated. Therefore, the good shape at the bending step can be maintained and improved even after the removal step, and a highly accurate bent shape can be obtained. Furthermore, as the entire bent portion 73 is not heated, the core part of the bent optical fiber 70 that is a practical transmission path of an optical signal is less likely to be affected by heat, and even after the removal of minute scratches, good optical propagation characteristics can be achieved.

Moreover, an optical fiber can be bent through a desired angle, and a variation in the bending angle among the plurality of optical fibers 11 in the optical fiber array 10 can be reduced (within 2.0°). Furthermore, if the minute scratches are removed by heating the bent portion 73, the bending angle is further corrected, and the variation in the bending angle can be further reduced (within 1.0°).

Moreover, when assembling a connector having the above-described bent optical fibers built-in, the bent optical fibers needs to be in contact with another member or be inserted into another member. However, as there are no minute scratches on the inner surface of the bent optical fiber 11, the bent optical fiber can withstand the internal stress generated therein by indentation of the bent optical fiber 11, and breaking of the bent optical fiber 11 can be prevented. Accordingly, it is possible to achieve easy assembly, and it is also possible to provide the connector with built-in optical fibers 1 having good optical propagation characteristics.

The method for producing a bent optical fiber and the connector having the optical fibers built-in according to the present embodiment are described above. However, the present disclosure is not limited to the above-described embodiment, and various modifications and alterations can be made on the basis of technological thoughts of the present disclosure.

What is claimed is:

1. A method for producing a bent optical fiber obtained by performing a bending process on a silica optical fiber, the method comprising:
   bending the optical fiber along a contour of the heater by pressing the optical fiber against a heater having an arbitrary shape; and
   removing a defect in an inner surface of a bent portion of the bent optical fiber,
   wherein removing includes heating the inner surface using a non-contact heat source while adjusting a bending angle of the bent optical fiber to be a predetermined angle.

2. The method for producing the bent optical fiber according to claim 1, further comprising, cooling the bent optical fiber before removing the defect.

3. The method for producing the bent optical fiber according to claim 1, wherein the non-contact heat source is an arc discharge.

4. The method for producing the bent optical fiber according to claim 1, wherein the non-contact heat source is laser light.

5. The method for producing a bent optical fiber according to claim 1, wherein removing includes heating the bent optical fiber with the bent optical fiber being set on a fixing tool for fixing the bent optical fiber at a predetermined angle.

6. The method for producing a bent optical fiber according to claim 1, wherein the bending includes bending the optical fiber so that a bend radius of the bent portion is less than or equal to 5 mm.

7. The method for producing a bent optical fiber according to claim 1, wherein the predetermined angle is greater than or equal to 85° but less than or equal to 150°.

8. The method for producing a bent optical fiber according to claim 1, wherein removing includes heating the bent optical fiber so that, when the bent portion of one bent optical fiber is divided into a plurality of regions along a longitudinal direction at 10°, a variation in bend radius among the plurality of regions excluding regions corresponding to 10° at both ends is less than or equal to 0.3 mm.

9. The method for producing a bent optical fiber according to claim 1, wherein removing includes heating the bent optical fiber so that the inner surface of the bent portion is a satin finished surface.

10. The method for producing a bent optical fiber according to claim 1, wherein an outer diameter of the bent portion of the bent optical fiber obtained at the removal is smaller than an outer diameter of a linear portion of the bent optical fiber.

11. The method for producing a bent optical fiber according to claim 1, wherein the number of the bent optical fibers is four or more, and a difference between the maximum angle and the minimum angle in a plurality of bent portions of all the bent optical fibers is within 2.0°.

12. The method for producing a bent optical fiber according to claim 1, wherein a cross-sectional shape of the bent portion obtained at removal is a substantially elliptical shape having a minor axis that is a direction connecting an inner surface and an outer surface of the bent portion.

13. The method for producing a bent optical fiber according to claim 1, wherein a linear portion of the bent optical fiber has an outer diameter of 80 μm to 126 μm.

14. The method for producing a bent optical fiber according to claim 1, wherein a linear portion of the bent optical fiber has an outer diameter of preferably 124 μm to 126 μm, and the bent portion per bent optical fiber has a strength of greater than or equal to 0.25 N.

15. A method for producing a connector with built-in bent optical fibers, the method comprising:
- bending the optical fiber along a contour of the heater by pressing a silica optical fiber against a heater having an arbitrary shape;
- removing a defect in an inner surface of a bent portion of the bent optical fiber;
- forming an optical fiber array including the plurality of bent optical fibers produced by the removing;
- arranging end portions of the plurality of bent optical fibers at a plurality of positioning mechanisms in a ferrule to accommodate the optical fiber array in the ferrule; and
- filling resin in the ferrule on an outer periphery of the bent portions,
- wherein removing includes heating the inner surface using a non-contact heat source while adjusting a bending angle of the bent optical fiber to be a predetermined angle.

* * * * *